United States Patent
Sato et al.

[11] Patent Number: 6,125,141
[45] Date of Patent: Sep. 26, 2000

[54] DEVICE AND METHOD FOR DETECTING MOTION VECTORS

[75] Inventors: Hidenori Sato; Kenichi Asano, both of Tokyo, Japan

[73] Assignee: Mitsubishi Denki Kabushiki Kaisha, Tokyo, Japan

[21] Appl. No.: 09/118,722

[22] Filed: Jul. 20, 1998

[30] Foreign Application Priority Data

Dec. 18, 1997 [JP] Japan .................................. 9-349844

[51] Int. Cl.[7] .............................. H04B 1/66; H04N 5/14
[52] U.S. Cl. ..................... 375/240; 382/236; 382/240; 348/699
[58] Field of Search ..................... 348/384, 390, 348/393, 395, 396, 402, 405, 407, 413, 415, 416, 419, 426, 699, 700, 702; 375/240; 382/232, 233, 236, 240; 345/516; 370/94.1; H04B 1/66; H04N 5/14

[56] References Cited

U.S. PATENT DOCUMENTS

| | | | |
|---|---|---|---|
| 5,228,028 | 7/1993 | Cuchi et al. | 370/94.1 |
| 5,512,974 | 4/1996 | Abe et al. | 354/430 |
| 5,731,850 | 3/1998 | Maturi et al. | 348/699 |
| 5,760,836 | 6/1998 | Greenfield et al. | 348/419 |
| 5,832,120 | 11/1998 | Prabhakar et al. | 382/233 |
| 5,883,672 | 3/1999 | Suzuki et al. | 348/405 |
| 5,963,222 | 10/1999 | Cheney et al. | 345/516 |
| 5,969,772 | 10/1999 | Sacki | 348/699 |
| 5,987,180 | 11/1999 | Reitmeier | 382/236 |
| 6,014,481 | 1/2000 | Sun | 348/699 |
| 6,028,931 | 2/2000 | Nakay et al. | 348/384 |

FOREIGN PATENT DOCUMENTS

| | | |
|---|---|---|
| 7-115646 | 5/1995 | Japan . |
| 2271036A | 3/1994 | United Kingdom . |

*Primary Examiner*—Chris S. Kelley
*Assistant Examiner*—Tung Vo

[57] ABSTRACT

A motion vector detecting device re-arranges the pixel values which make up an initial block for color-difference signals, allowing for their superimposition, to produce a new color-difference signal block having the same number of pixels as that of a luminance signal block. The new color-difference signal block and a luminance signal block are respectively compared with a block for a reference image signal to perform block matching.

10 Claims, 18 Drawing Sheets

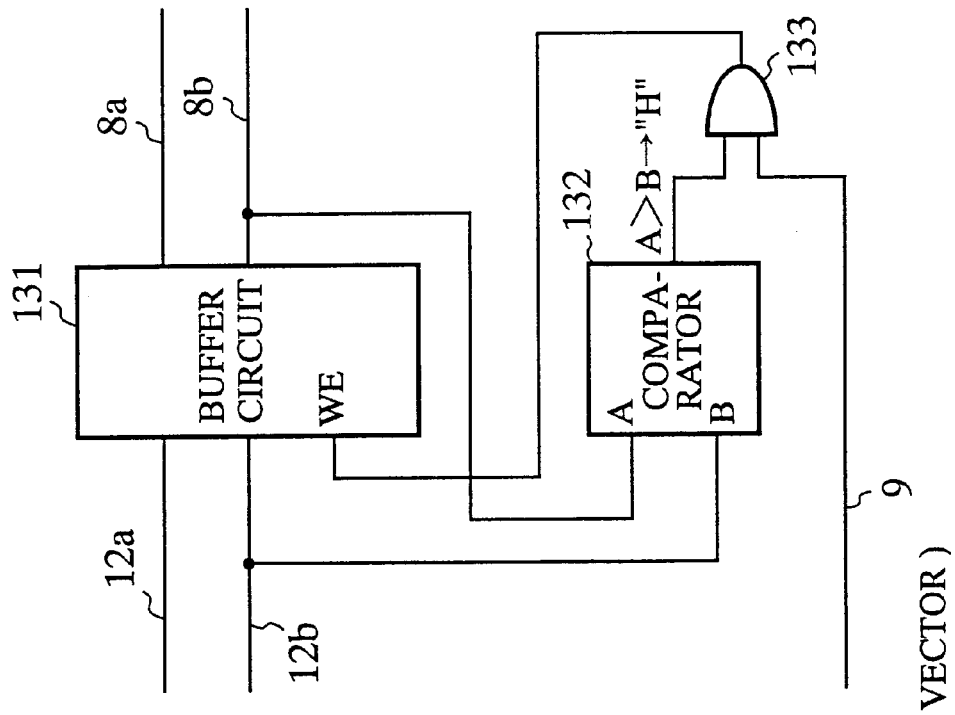
FIG.3 (1)
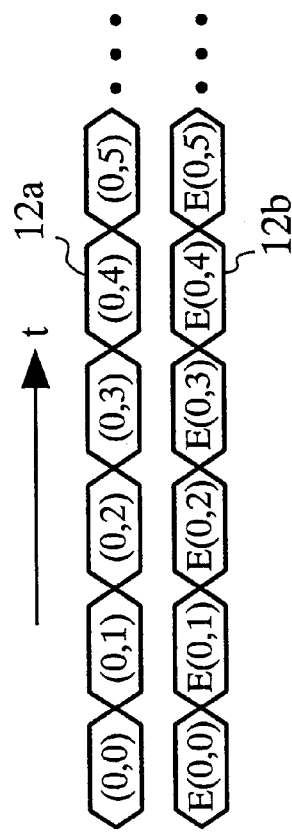
FIG.3 (2)
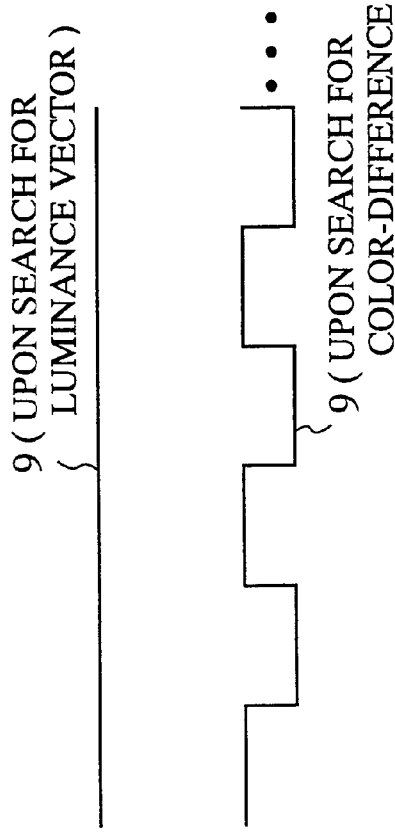
FIG.3 (3)

PREDICTED IMAGE

REFERENCE IMAGE

FIG.6 (1)
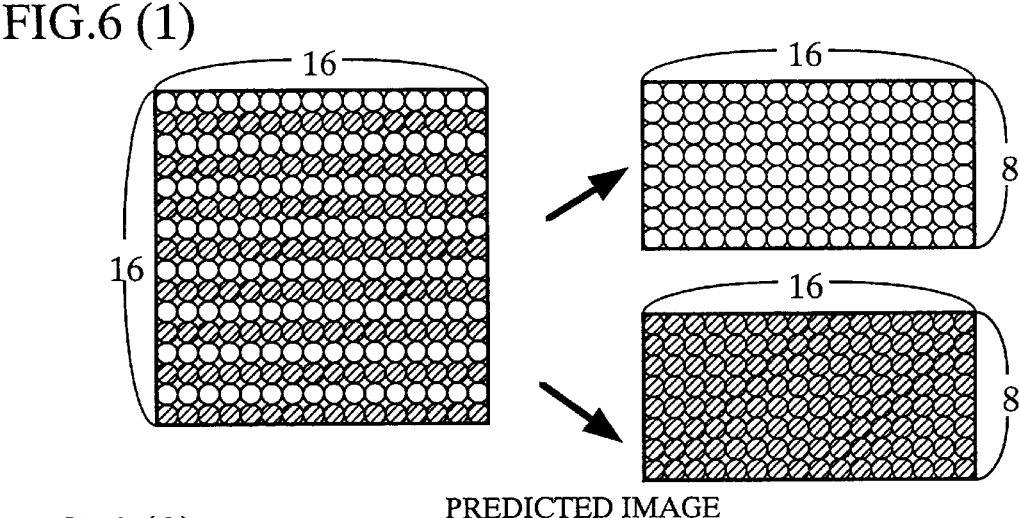
PREDICTED IMAGE
FIG.6 (2)
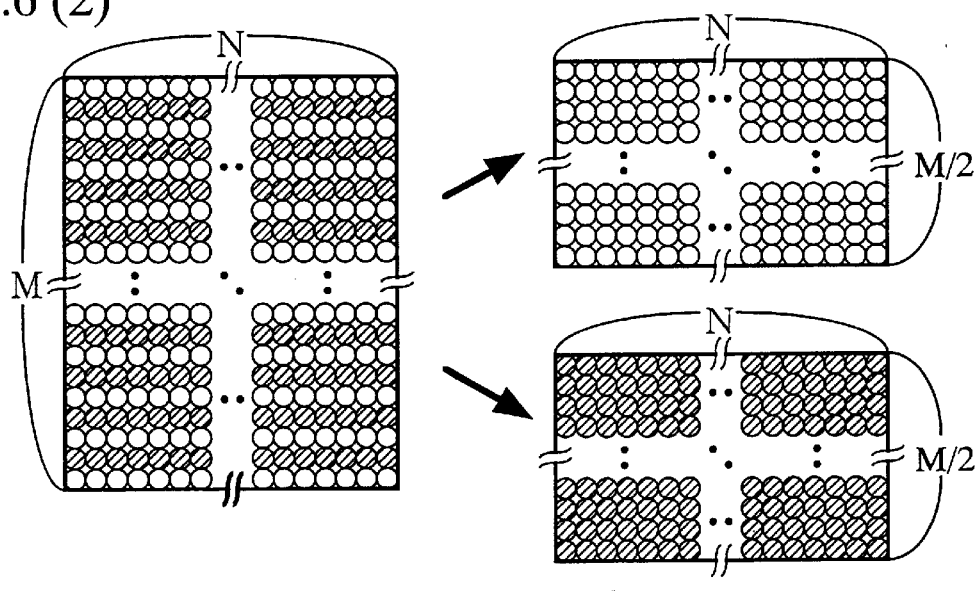
REFERENCE IMAGE
FIG.6 (3)
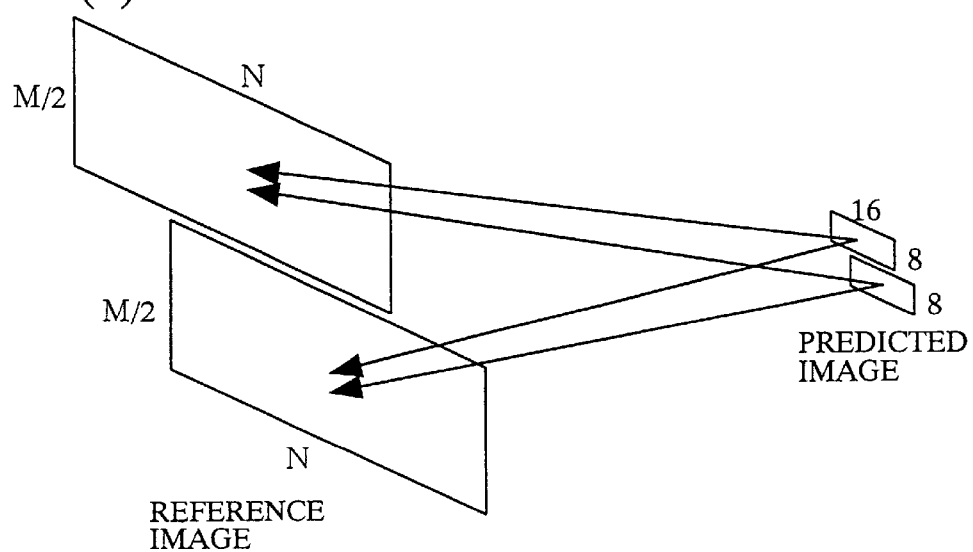

PREDICTED IMAGE

REFERENCE IMAGE

PREDICTED IMAGE

FIG.10 (1)
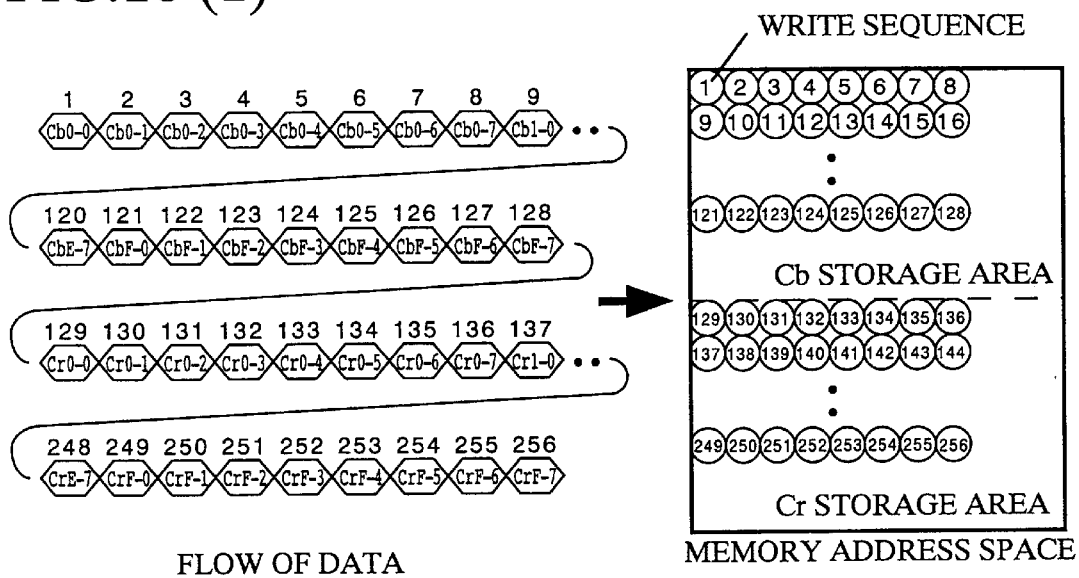
FLOW OF DATA  MEMORY ADDRESS SPACE
WRITE PHASE
FIG.10 (2)
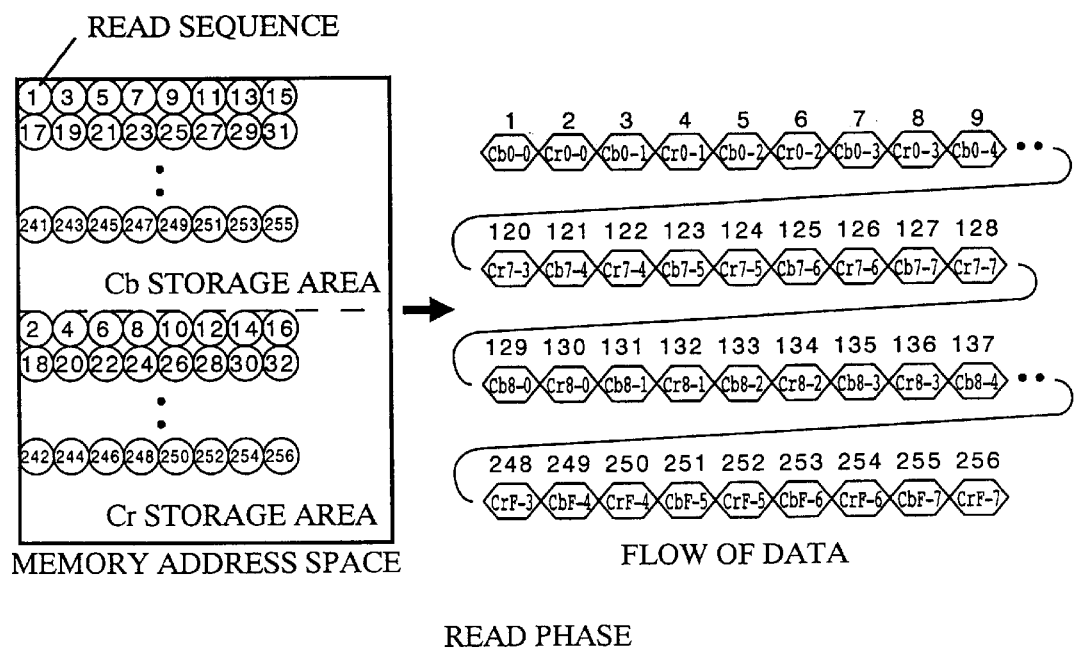
MEMORY ADDRESS SPACE  FLOW OF DATA
READ PHASE

PREDICTED IMAGE

REFERENCE IMAGE

FIG.13 (1)
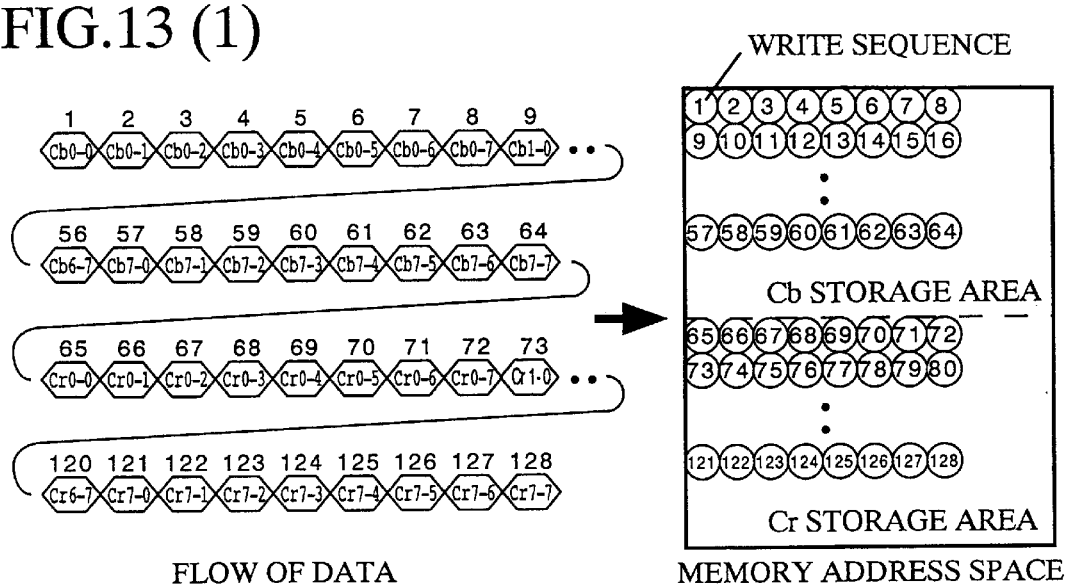
FLOW OF DATA    MEMORY ADDRESS SPACE
WRITE PHASE
FIG.13 (2)
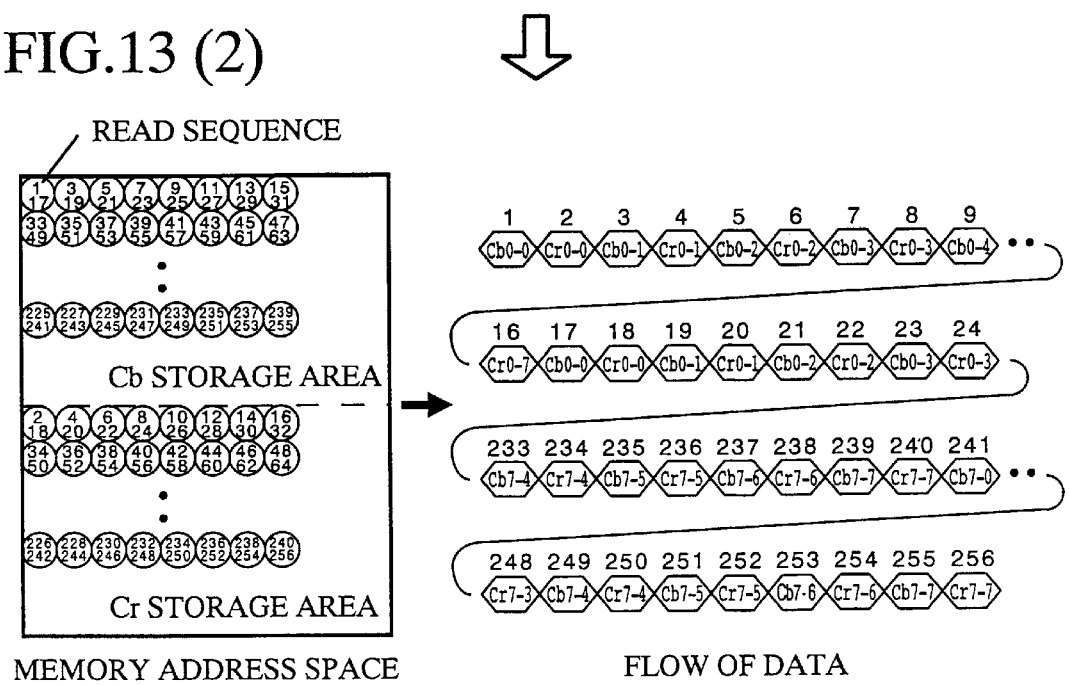
MEMORY ADDRESS SPACE    FLOW OF DATA
READ PHASE

PREDICTED IMAGE

FIG.15 (1)

PREDICTED IMAGE

FIG.15 (2)

PREFERENCE IMAGE

PREDICTED IMAGE

REFERENCE IMAGE

PREDICTED IMAGE

DEVICE AND METHOD FOR DETECTING MOTION VECTORS

BACKGROUND OF THE INVENTION

This application claims priority under 35 U.S.C. § § 119 and/or 365 to Hei 9-349844 filed in Japan on Dec. 12, 1997, the entire contents of which is herein incorporated by reference.

1. Field of the Invention

The present invention relates to a device for and a method for obtaining a motion vector by dividing a moving picture or image into a plurality of blocks and detecting motion vectors in each block.

2. Description of the Prior Art

Motion vector detection technique which are typically used to encode video information commonly use a block matching method has been commonly used which divides a present picture or image into a plurality of blocks and performs pattern matching with reference images in each block.

FIG. 21 is a block diagram illustrating an exemplary configuration of a conventional motion vector detecting device which uses such a block matching method. In FIG. 21, reference numeral 21 indicates a motion vector detector circuit for detecting each motion vector. Reference numeral 22 indicates a predicted image signal corresponding to an image signal indicative of the present picture or blocked image, which is input to the motion vector detector circuit 21. Reference numeral 23 indicates a control circuit for controlling the entire operation of the motion vector detecting device. Reference numeral 24 indicates an address signal outputted from the control circuit 23. Reference numeral 25 indicates a frame memory for storing an image signal. Reference numeral 26 indicates an image signal such as a local decoded image or the like. Reference numeral 27 indicates a reference image signal read from the frame memory 25. Reference numeral 28 indicates a signal outputted from the motion vector detector circuit 21, which includes an optimum motion vector and an optimum evaluated value, such as the sum of absolute differential values of pixels between a predicted image and a reference image related to the optimum motion vector or the like.

The operation of the motion vector detecting device will next be explained.

The motion vector detector circuit 21 compares a predicted image signal with a reference image signal 27 read from the frame memory 25 to determine an optimum motion vector and an optimum evaluated value, which are subsequently output as an output signal 28.

The motion vector detector circuit 21 also determines motion vectors according to block matching for luminance and color-difference signals. Thus, as shown in FIG. 22, if the block size of a luminance signal Y and color-difference signals Cb and Cr related to an image to be subjected to a block matching process are identical (for example, the horizontal and vertical directions include 16 pixels respectively as shown FIG. 22), then a circuit for determining an optimum luminance vector from the luminance signal Y can be employed to obtain an optimum color-difference vector from the color-difference signals Cb and Cr.

Image encoding systems such as an MPEG (Moving Picture Experts Group) 2 commonly use, formats such as a "4:2:2 format," in which the horizontal sizes of blocks for the color-difference signals Cb and Cr are respectively equal to ½ the block size of a luminance signal Y (as shown in FIG. 23), or a format such as "4:2:0 format", in which the horizontal and vertical sizes of blocks for color-difference signals Cb and Cr are respectively ½ the block size for a luminance signal Y (as shown in FIG. 24)

Thus, when blocks for a luminance signal Y and color-difference signals Cb and Cr have different sizes, significantly different circuit configuration are usually relied on to obtain an optimum luminance vector and an optimum color-difference vector.

Since the conventional motion vector detecting device and method are configured in the above-described manner, the circuit configuration of the optimum luminance vector determining circuit and the optimum color-difference vector determining circuit are different, thereby increasing development costs and lowering general versatility.

SUMMARY OF THE INVENTION

In view of the foregoing, it is therefore an object of this invention to provide a motion vector detecting device and a motion vector detecting method which are capable of determining an optimum color-difference vector by using a circuit which is substantially identical to the that for determining an optimum luminance vector, thus reducing development costs and providing increased general versatility.

According to a first aspect of this invention, for achieving the above object, there is provided a motion vector detecting device, including:

color-difference signal block generator for re-arranging the values of the pixels constituting an initial block for the color-difference signals, allowing for their superimposition, to generate a new color-difference signal block having the same number of pixels as that of the luminance signal block;

an evaluated value calculator for comparing the new color-difference signal block generated by the color-difference signal block generator and the luminance signal block respectively with a reference image signal block to perform block matching, thereby detecting motion vectors and evaluated values; and motion vector selector for selecting an optimum evaluated value and an optimum motion vector corresponding to the optimum evaluated value from the evaluated values calculated by the evaluated value calculating means.

Thus, a motion vector detecting device and a motion vector detecting method are provided which are capable of determining an optimum color-difference vector by using a circuit which is substantially identical to that used for determining an optimum luminance vector, thus reducing development costs and providing increasing general versatility.

According to a second aspect of this invention, there is provided a motion vector detecting device wherein, when the number of horizontal pixels in an initial block for color-difference signals is equal to one-half the number of horizontal pixels in a luminance signal block, the color-difference signal block generator arranges the values of the same pixels for the color-difference signals twice in the horizontal direction to create a new color-difference signal block having the same number of pixels as the luminance signal block. Thus, a motion vector detecting device is provided which is capable of searching a motion vector for single-unit color-difference signals given in 4:2:2 format using the same motion vector detector circuit as that used for a luminance vector search, thus reducing development costs and increasing general versatility.

According to a third aspect of this invention, there is provided a motion vector detecting device wherein, when the numbers of horizontal and vertical pixels in an initial block for color-difference signals are equal to the respective halves of the numbers of horizontal and vertical pixels in a luminance signal block, the color-difference signal block generator arranges the values of the same pixels for the color-difference signals twice in the horizontal and vertical directions respectively to create a new color-difference signal block having the same number of pixels as that of the luminance signal block.

Thus, a motion vector detecting device is provided which is capable of searching a motion vector for single-unit color-difference signals in 4:2:0 format using the same motion vector detector circuit as that used for a luminance vector search, thus reducing development costs and providing increasing general versatility.

According to a fourth aspect of this invention, there is provided a motion vector detecting device wherein, when the numbers of horizontal and vertical pixels in an initial block for color-difference signals are equal to the respective halves of the numbers of horizontal and vertical pixels in a luminance signal block, the color-difference signal block generator arranges the values of the same pixels for the color-difference signals twice in the horizontal direction and then arranges the values of said twice-arranged horizontal pixels twice by the two pixel-wide block in the vertical direction to create a new color-difference signal block having the same number of pixels as that of the luminance signal block. Thus, even in the case of a motion vector searching method for dividing color-difference signals into two blocks based on alternate pixels in the vertical direction and searching the motion vectors corresponding to the divided images, as when searching a motion vector for single-unit color-difference signals given in 4:2:0 format, a motion vector detecting device is provided which is capable of obtaining an optimum luminance vector and an optimum evaluated value using the same motion vector detector circuit, thus reducing development costs and increasing general versatility.

According to a fifth aspect of this invention, there is provided a motion vector detecting device wherein motion vector selecting means eliminates, from objects to be selected, evaluated values when the horizontal vector assumes an odd number upon block matching, and then selects an optimum evaluated value and a corresponding optimum motion vector.

Thus, a motion vector detecting device is provided which is capable of searching a motion vector for two types of color-difference signals using the same motion vector detector circuit as that used for a luminance signal search, thus reducing development costs and increasing large general versatility.

According to a sixth aspect of this invention, there is provided a motion vector detecting device wherein, when the number of horizontal pixels in an initial block for color-difference signals is equal to one-half the number of horizontal pixels in a luminance signal block, the color-difference signal block generator alternately arranges, in the horizontal direction, the values of pixels corresponding to the two types of color-difference signals to generate a new color-difference signal block having the same number of pixels as that of the luminance signal block.

Thus, a motion vector detecting device is obtained which is capable of searching a luminance vector and a color-difference vector by using the same motion vector detector circuit even when searching a motion vector for two types of color-difference signals in 4:2:2 format, thus reducing development costs and increasing general versatility.

According to a seventh aspect of this invention, there is provided a motion vector detecting device wherein, when the numbers of horizontal and vertical pixels in an initial block for color-difference signals are equal to the respective halves of the numbers of horizontal and vertical pixels in a luminance signal block, the color-difference signal block generator alternately arranges the values of pixels corresponding to the two types of color-difference signals in the horizontal direction, arranges the values of the alternately-arranged horizontal pixels twice in the vertical direction and thereby creates a new color-difference signal block having the same number of pixels as that of the luminance signal block.

Thus, a motion vector detecting device is provided which is capable of searching a motion vector for two types of color-difference signals in 4:2:0 format using the same motion vector detector circuit as that used for a luminance vector search, thus reducing development costs and increasing versatility.

According to an eighth aspect of this invention, there is provided a motion vector detecting device wherein, when the numbers of horizontal and vertical pixels in an initial block for color-difference signals are equal to the respective halves of the numbers of horizontal and vertical pixels in a luminance signal block, the color-difference signal block generator alternately arranges the values of pixels corresponding to the two types of color-difference signals in the horizontal direction and arranges the values of the alternately-arranged horizontal pixels by the two pixel-wide block twice in the vertical direction to create a new color-difference signal block having the same number of pixels as that of the luminance signal block.

Thus, a motion vector detecting device is provided which is capable of obtaining an optimum luminance vector and an optimum evaluated value by using the same motion vector detector circuit, thereby reducing development costs and increasing general versatility even in the case of a motion vector searching method for dividing color-difference signals into two blocks on the basis of alternate pixels in the vertical direction and searching motion vectors corresponding to the divided images, as when searching a motion vector for two types of color-difference signals in 4:2:0 format.

According to a ninth aspect of this invention, there is provided a motion vector detecting method, including:
- a color-difference signal block generating step for re-arranging the values of the pixels constituting an initial block for the color-difference signals allowing for their superimposition to produce a new color-difference signal block having the same number of pixels as that of the luminance signal block;
- an evaluated value calculating step for comparing the new color-difference signal block produced in the color-difference signal block generating step and the luminance signal block with a block for a reference image signal to perform the block matching, and thereby detecting motion vectors and evaluated values; and
- a motion vector selecting step for selecting an optimum evaluated value and a corresponding optimum motion vector from the evaluated values and motion vectors calculated in the evaluated value calculating step.

Thus, a motion vector detecting method is provided which is capable of searching a motion vector for two types of color-difference signals using the same motion vector detector circuit as that used for a luminance vector search, thus reducing development costs and increasing general versatility.

According to a tenth aspect of this invention, there is provided a motion vector detecting method wherein, in a motion vector selecting step, evaluated values when a horizontal vector assumes an odd number upon block matching are eliminated from the objects to be selected so that an optimum evaluated value and a corresponding optimum motion vector are selected.

Thus, a motion vector detecting method is provided which is capable of searching a motion vector for two types of color-difference signals using the same motion vector detector circuit as that used for a luminance vector search, thus reducing development costs and providing large general versatility.

BRIEF DESCRIPTION OF THE DRAWINGS

Other objects and advantages of the present invention will be more completely understood from the following detailed description, taken in conjunction with the accompanying drawings wherein:

FIG. 3(1) is a block diagram depicting a specific configuration of a motion vector selector shown in FIG. 2;

FIGS. 3(2) and 3(3) are respectively diagrams showing waveforms of signals inputted to the motion vector selector shown in FIG. 3(1);

FIG. 6(1) is a diagram depicting another example of a block for a predicted image signal which is searched by the motion vector detecting device shown in FIG. 1;

FIG. 6(2) is a diagram showing another example of a block for a reference image signal corresponding to the predicted image signal shown in FIG. 6(1);

FIG. 6(3) is a diagram for describing a method of searching the predicted image signal shown in FIG. 6(1);

FIGS. 10(1) and 10(2) are respectively diagrams for describing a method of inputting color-difference signals to a motion vector detector circuit shown in FIG. 1;

FIGS. 13(1) and 13(2) are respectively diagrams for describing a method of inputting color-difference signals to a motion vector detector circuit employed in the second embodiment of the present invention;

FIGS. 15(1) and 15(2) are respectively diagrams illustrating blocks for a predicted image signal and a reference image signal both searched by a motion vector detecting device according to a fourth embodiment of the present invention;

DETAILED DESCRIPTION OF THE PREFERRED EMBODIMENTS

Preferred embodiments of the present invention will hereinafter be described in detail with reference to the accompanying drawings.

First Embodiment

Figure 1:
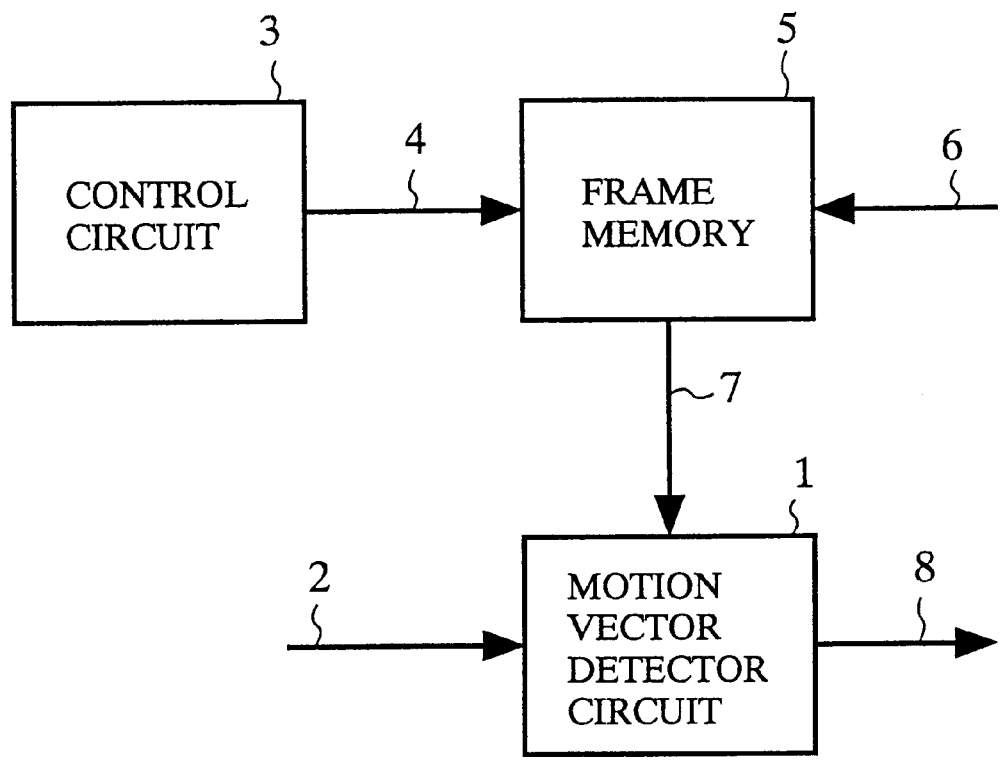
FIG. 1 is a block diagram showing a configuration of a motion vector detecting device according to a first embodiment of the present invention.

FIG. 1 is a block diagram showing a configuration of a motion vector detecting device configuration according to the first embodiment of the present invention. In FIG. 1, reference numeral 1 indicates a motion vector detector circuit for searching motion vectors and determining a motion vector which is most suitable for integer accuracy and evaluated values such as the sum of absolute differential values, etc. Reference numeral 2 indicates a predicted image signal corresponding to an image signal of a currently blocked image, which is inputted to the motion vector detector circuit 1. Reference numeral 3 indicates a control circuit for controlling the overall operation of the motion vector detecting device. Reference numeral 4 indicates an address signal outputted from the control circuit 3. Reference numeral 5 indicates a frame memory for storing an image signal therein. Reference numeral 6 indicates an image signal such as a local decoded image or the like. Reference numeral 7 indicates a reference image signal read from the frame memory 5. Reference numeral 8 indicates a signal such as an optimum motion vector, an optimum evaluation or evaluated value or the like, which is outputted from the motion vector detector circuit 1.

Figure 2:
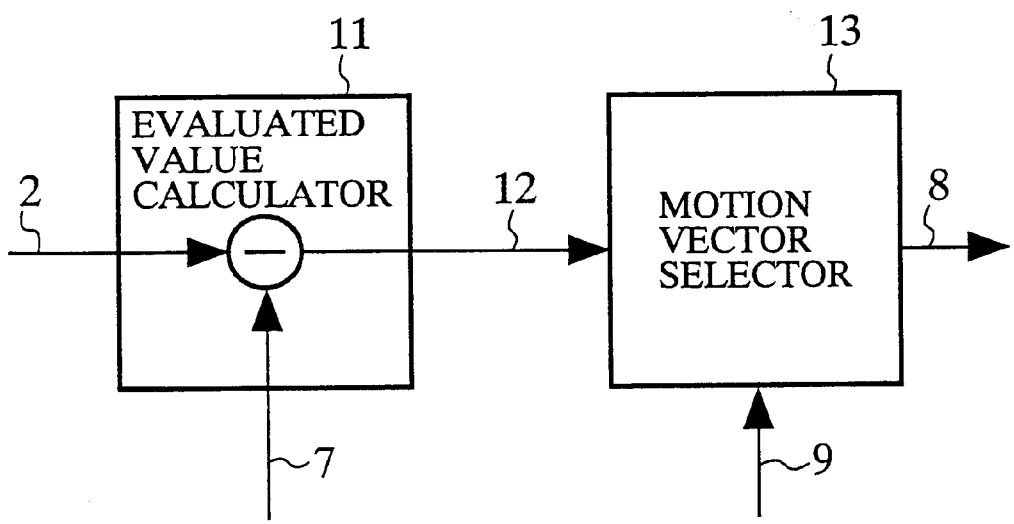
FIG. 2 is a block diagram illustrating an internal configuration of the motion vector detecting device shown in FIG. 1.

FIG. 2 is a block diagram showing an internal configuration of the motion vector detector circuit 1 shown in FIG. 1. In the drawing, reference numeral 9 indicates a control signal such as one of the individual mode select signals or similar signal. Reference numeral 11 indicates an evaluated value calculator (evaluated value calculating means) for calculating an evaluation or evaluated value such as the sum of absolute differential values, based on a predicted image signal 2 and a reference image signal 7. Reference numeral 12 indicates a signal outputted from the evaluated value calculator 11, which consists of a motion vector and an evaluated value for the predicted image signal 2. Reference numeral 13 indicates a motion vector selector (motion vector selecting means) for determining and outputting an optimum motion vector and an optimum evaluated value from the input motion vector and evaluated value.

FIG. 3(1) is a block diagram showing a specific configuration of the motion vector selector 13 shown in FIG. 2. FIGS. 3(2) and 3(3) are respectively diagrams showing waveforms of signals inputted to the motion vector selector 13. In FIGS. 3(1) and 3(2), reference numeral 12a indicates a motion vector outputted from the evaluated value calculator 11 shown in FIG. 2. Reference numeral 12b indicates an evaluated value outputted from the evaluated value calculator 11. Incidentally, the numerical values inside the parentheses in the motion vector 12a and the evaluated value 12b of FIG. 3 indicate vertical magnitudes as the initial numerical values and horizontal magnitudes as the next values, respectively.

In FIG. 3(1), reference numeral 131 indicates a buffer circuit for temporarily storing the motion vector 12a and the evaluated value 12b. Reference symbol WE indicates a write enable terminal of the buffer circuit 131. Reference numeral 8a indicates an optimum motion vector read from the buffer circuit 131. Reference numeral 8b indicates an optimum evaluated value read from the buffer circuit 131. Reference numeral 132 indicates a comparator having a terminal A for receiving or inputting the optimum evaluated value 8b held in the buffer circuit 131 and a terminal B for receiving or inputting the evaluated value 12b inputted to the buffer circuit 131 and for making H level signals in an output terminal thereof when the value inputted to the input terminal A is greater than the value inputted to the input terminal B. Reference numeral 133 indicates a two-input AND gate which receives the output of the comparator 132 and the control signal 9 and has an output terminal electrically connected to the write enable terminal WE of the buffer circuit 131.

The operation of the motion vector detecting device according to the first embodiment will next be described.

The operation of the motion vector detecting device at the time that a luminance vector is detected by the motion vector detecting device, will first be explained.

The evaluated value calculator 11 of the motion vector detector circuit 1 in the motion vector detecting device first performs block matching by shifting a block for a predicted image signal relative to a block for a reference image signal by one pixel, based on a predicted image signal 2 and a reference image signal 7 inputted thereto to search a motion vector and determine an evaluated value such as the sum of absolute differential values. Thereafter, the evaluated value calculator 11 outputs the obtained motion vector 12a and evaluated value 12b to the motion vector selector 13 as an output signal 12.

Figure 4:
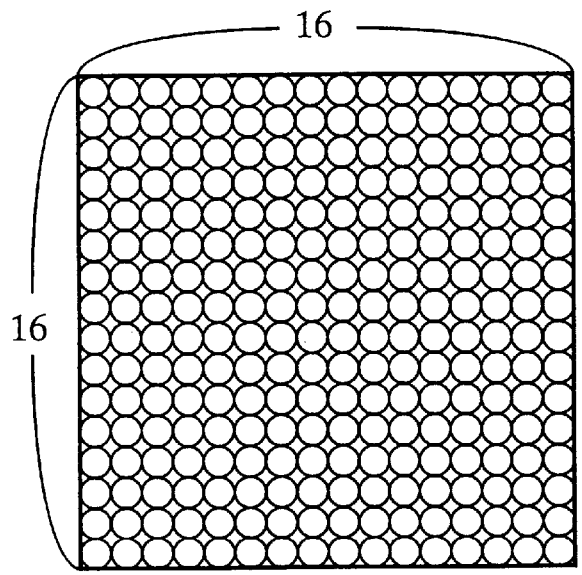
FIG. 4 is a diagram showing an example of a block for a predicted image signal, which is searched by the motion vector detecting device shown in FIG. 1.
Figure 5:
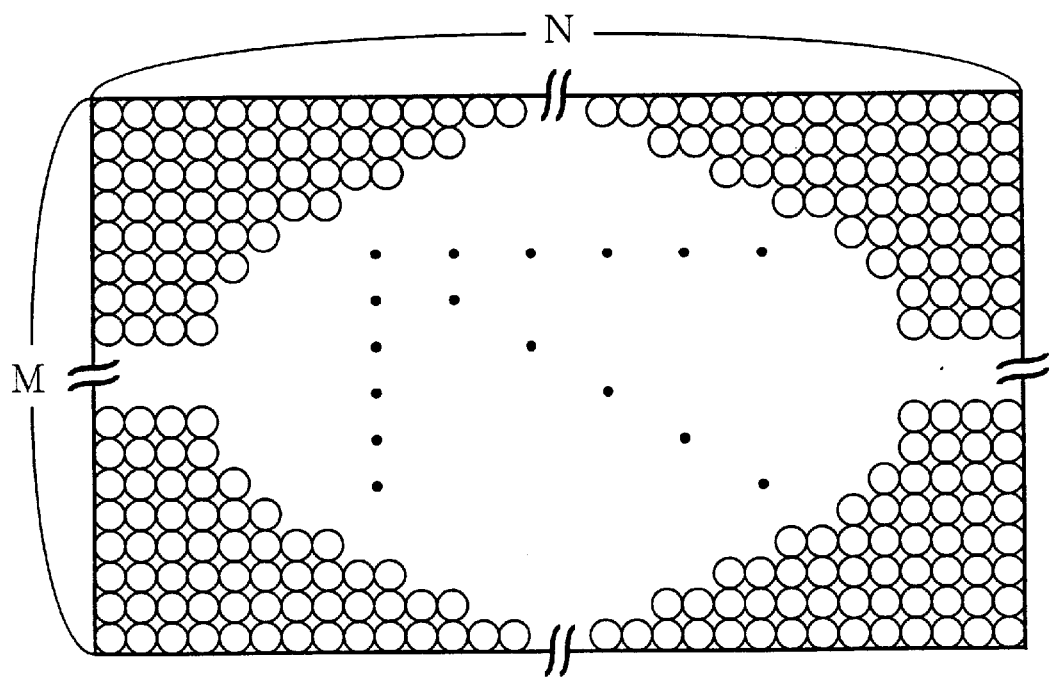
FIG. 5 is a diagram illustrating an example of a block for a reference image signal corresponding to the predicted image signal shown in FIG. 4.

The predicted image signal 2 inputted to the motion vector detecting device is inputted in units of blocks (which will hereinafter be represented as "16×16 pixel blocks") each comprising 16 pixels extending in the horizontal direction and 16 pixels in the vertical direction as shown for example in FIG. 4. The reference image signal 7 associated with the predicted image signal 2 is inputted in units of blocks each comprised of N×M (where N and M respectively indicate positive integers indicative of the numbers of pixels in a search range) pixels according to the search range as shown in FIG. 5. The bit widths of the predicted image signal 2 and the reference image signal 7 and the sequence of inputting such signals to the motion vector detector circuit 1 can be arbitrarily set.

Figure 7:
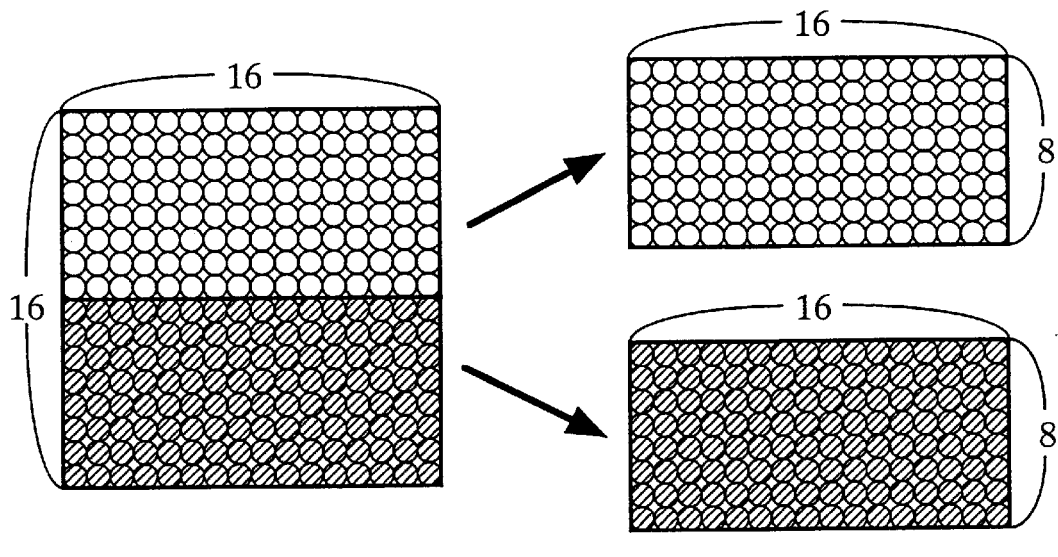
FIG. 7 is a diagram showing a further example of a predicted image signal, which is searched by the motion vector detecting device shown in FIG. 1.

The evaluated value calculator for the motion vector in accordance with known methods. Specifically, if motion vectors for an image signal to be transmitted by an encoder using the motion vector detecting device according to the first embodiment remain held in block units of 16×16 pixels, the evaluated value calculator 11 searches the motion vectors as held in the block units of 16×16 pixels. Alternatively, if both a predicted image and a reference image are respectively divided into two blocks on alternate pixels in the vertical direction as shown in FIGS. 6(1) and 6(2) and motion vectors corresponding to the divided image are transmitted, then the evaluated value calculator 11 separately searches respective motion vectors with respect to the divided respective blocks as shown in FIG. 6(3). Further, if a block for a predicted image is divided into upper and lower parts as shown in FIG. 7 and motion vectors corresponding to the divided images are transmitted, then the evaluated value calculator 11 searches respective motion vectors with respect to the divided respective blocks each comprised of 16×8 pixels. Incidentally, the motion vectors may be searched by utilizing any combination of the above methods.

In the motion vector selector 13, the comparator 132 next compares the optimum evaluated value 8b held in the buffer circuit 131 with the evaluated value 12b inputted from the evaluated value calculator 11. When the optimum evaluated value 8b held in the buffer circuit 131 is greater than the evaluated value 12b, the comparator 132 outputs an H level output signal to the AND gate 133. On the other hand, the control signal 9 is inputted to the other input terminal of the AND gate 133, however it is in the form of an H level at all times when searching a luminance vector. Thus, when the optimum evaluated value 8b held in the buffer circuit 131 is greater than a newly input evaluated value 12b, the AND gate 133 outputs an H level signal. When the write enable terminal WE of the buffer circuit 131 operates in positive logic form and the output signal of the AND gate 133 is H level, the optimum motion vector 8a and the optimum evaluated value 8b held in the buffer circuit 131 are updated. Thus, the motion vector selector 13 outputs the updated optimum motion vector 8a and optimum evaluated value 8b as an output signal 8.

The operation of the motion vector detecting device when that color-difference signals represented in 4:2:2 format are inputted to the motion vector detecting device to thereby determine color-difference vectors, will next be explained.

Figure 9:
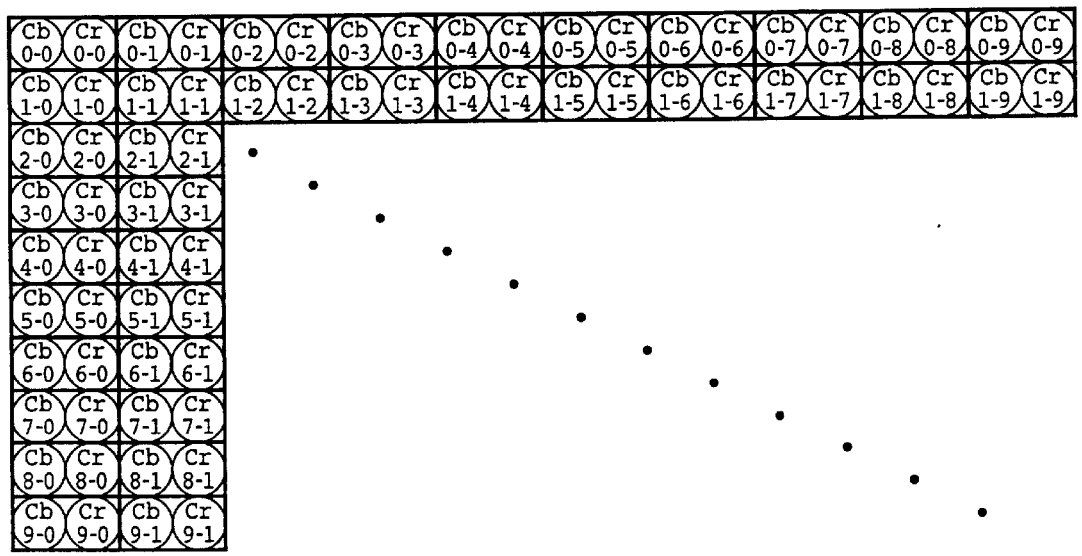
FIG. 9 is a diagram depicting a block for a reference image signal searched by the motion vector detection device shown in FIG. 1.
Figure 8:
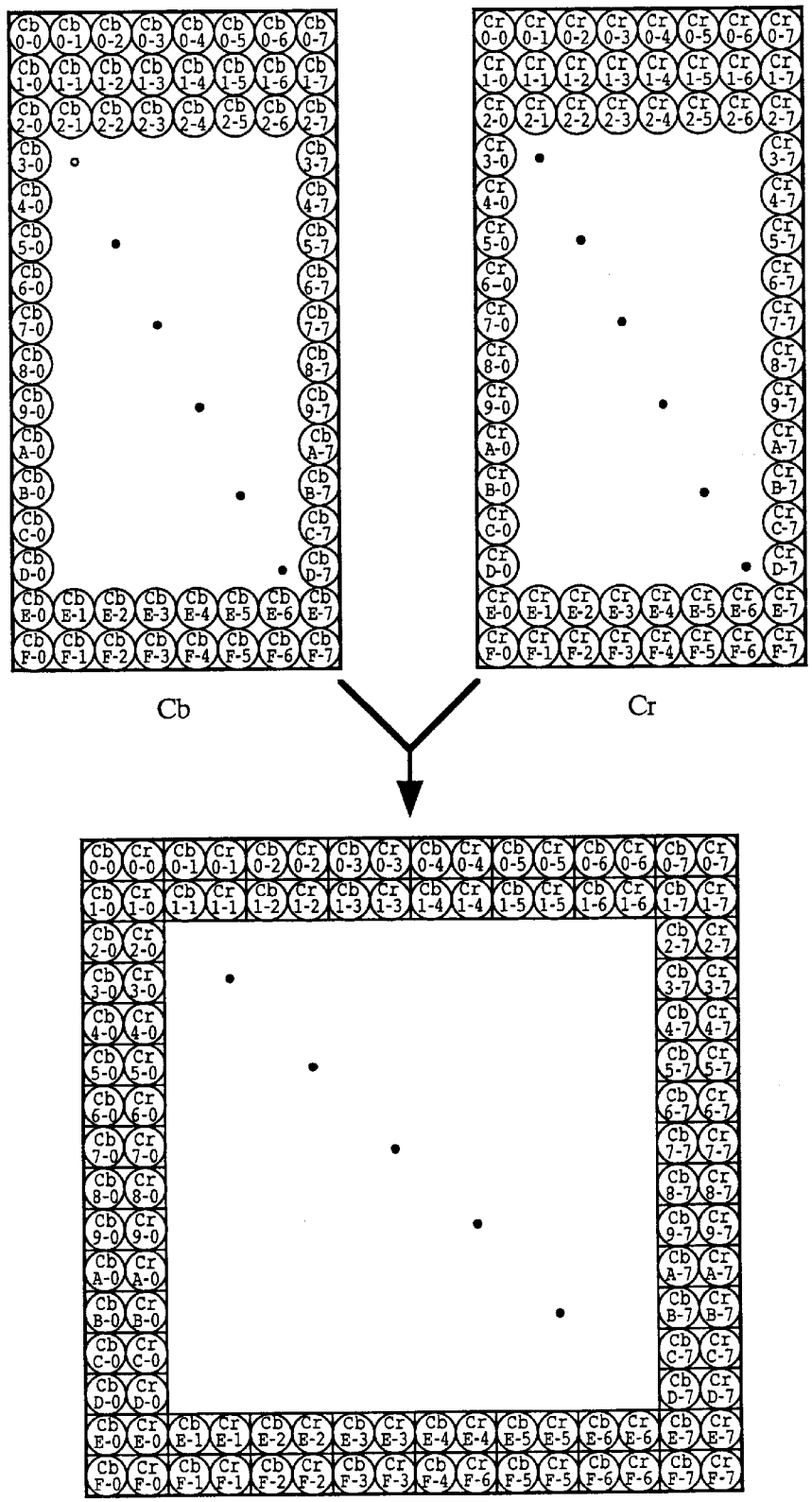
FIG. 8 is a diagram illustrating a block for a predicted image signal, which is searched by the motion vector detecting device shown in FIG. 1.

Two types of color-difference signals will be represented as Cb and Cr, addresses for pixels extending in the vertical direction within an image block will be represented as i, addresses for pixels extending in the horizontal direction will be represented as j and color-difference signals Cb at (i, j) addresses will be represented as Cbi-j. Similarly, color-difference signals Cr at (i, j) addresses will be defined as Cri-j. The motion vector detecting device according to the first embodiment alternately places color-difference signals Cb and Cr at their corresponding addresses in the horizontal direction in pairs as shown in FIGS. 8 and 9 (illustrative of a predicted image and a reference image together) and inputs them to the motion vector detector circuit 1 in the same sequence as that for each luminance signal as blocks identical in size to a predicted image signal or reference image signal block for luminance signals.

FIG. 10 is a diagram illustrating the operation of the motion vector detecting device, for alternately placing the color-difference signals Cb and Cr at their corresponding addresses in pairs in the horizontal direction and inputting Cb and Cr to the motion vector detector circuit 1 in the same sequence as that for the luminance signal as described above. FIG. 10(1) shows the sequence of writing color-difference signals Cb and Cr inputted to the motion vector detecting device into a memory (where memory for a predicted image signal is not shown in the drawing and the frame memory 5 is used for storing a reference image signal). FIG. 10(2) illustrates the sequence of reading color-difference signals Cb and Cr from memory.

Upon writing color-difference signals into their corresponding memory, the color-difference signals Cb are first written into a storage area provided at a stage above the memory in order of addresses as shown in FIG. 10(1). Thereafter, the color-difference signals Cr are written into a storage area provided at a stage below the memory in order of addresses. Upon reading color-difference signals from the memory, a color-difference signal Cb0-0 at the leading address of the color-difference signals Cb is first read and a color-difference signal Cr0-0 at the leading address of the color-difference signals Cr is next read, as shown in FIG. 10(2). In this way, the color-difference signals Cb and Cr at their corresponding addresses are alternately read in address order. Thus, the block for the predicted image signal and the block for the reference image signal shown respectively in FIGS. 8 and 9 are obtained, and the predicted image signal 2 and the reference image signal 7 corresponding to these blocks are inputted to the evaluated value calculator 11 of the motion vector detector circuit 1.

In a manner similar to the processing for the luminance signal, the evaluated value calculator 11 calculates evaluated values such as the sum of absolute differential values, etc., based on the input predicted image signal 2 and reference image signal 7 using a known method and outputs such values to the motion vector selector 13 as a motion vector 12a and an evaluated value 12b.

The comparator 132 in the motion vector selector 13 compares the optimum evaluated value 8b held in the buffer circuit 131 with the evaluated value 12b inputted from the evaluated value calculator 11 in a manner similar to the processing for the luminance vector. When the optimum evaluated value 8b held in the buffer circuit 131 is greater than the evaluated value 12b, the comparator 132 outputs an H level output signal to the AND gate 133. On the other hand, a control signal 9 during a color-difference vector search takes an L level upon movement of a predicted image block at an odd-numbered time so that an evaluated value 12b is excluded from the objects to be compared by the comparator 132 if it is at a position (corresponding to the position where a horizontal vector takes an odd number) where the number of times that the predicted image block is moved in the horizontal direction takes an odd-numbered time. Thus, the AND gate outputs an H level signal only when the movement of the predicted image block in the horizontal direction is equivalent to an even-numbered movement and the optimum evaluated value 8b held in the buffer circuit 131 is greater than a newly input evaluated value 12b. When the output signal of the AND gate 133 is an H level signal, the optimum motion vector 8a and optimum evaluated value 8b held in the buffer circuit 131 are updated. Thus, the motion vector selector 13 determines and outputs the optimum motion vector 8a and the optimum evaluated value 8b so as not to select an evaluated value at a position where the number of times that the block for the predicted image signal is moved or shifted in the horizontal direction, takes is an odd number. This is because the evaluated value calculator 11 performs an arithmetic operation on the sum of absolute differential values between color-difference signals Cb and Cr at the positions where the block for the predicted image signal moving in the horizontal direction, is an odd number. Therefore, each evaluated value at the odd-numbered position will not be selected to avoid the selection of the evaluated value selected based on such an arithmetic operation as the optimum evaluated value.

According to the first embodiment described above, a motion vector detecting device is provided which is capable of searching the luminance and color-difference vectors using the same motion vector detector circuit 1, thus reducing development costs and increasing general versatility.

Second Embodiment

The aforementioned first embodiment determines the optimum motion vector for color-difference signals represented in 4:2:2 format. However, the purpose of the present second embodiment is to determine an optimum motion vector for color-difference signals represented in 4:2:0 format.

A motion vector detecting device according to the second embodiment is identical in configuration to that according to the first embodiment. However, two types of color-difference signals Cb and Cr are alternately arranged in the horizontal direction and further arranged twice in the vertical direction as a predicted image and a reference (shown respectively in FIGS. 11 or 12. Further, the Cb and Cr blocks are each set to the same size as a luminance signal block and inputted to a motion vector detector circuit 1. A motion vector selector 13 of the motion vector detector circuit 1 omits or eliminates an evaluated value 12b at a position where a horizontal vector assumes an odd number, from objects to be compared by a comparator 132 to determine the optimum motion vector 8a and the optimum evaluated value 8b for color-difference signals in 4:2:0 format.

FIGS. 13(1) and 13(2) are respectively diagrams for the operation of the motion vector detecting device, for alternately arranging the predicted image and the reference image together in the horizontal direction and further arranging such images twice in the vertical direction, making each image the same size as a luminance signal block and inputting the resulting image to the motion vector detector circuit 1, as described above. FIG. 13(1) shows the sequence of writing color-difference signals Cb and Cr inputted to the motion vector detecting device into memory (where frame memory 5 is used as memory for a reference image signal in a manner similar to the first embodiment). FIG. 13(2) illustrates the sequence of reading the color-difference signals Cb and Cr from memory.

Upon writing the color-difference signals Cb and Cr to memory, the color-difference signals Cb are first successively stored in a storage area located at a stage above the memory in address order as shown in FIG. 13(1). Next, the color-difference signals Cr are successively stored in a storage area provided at a stage below the memory in address order.

Figure 11:
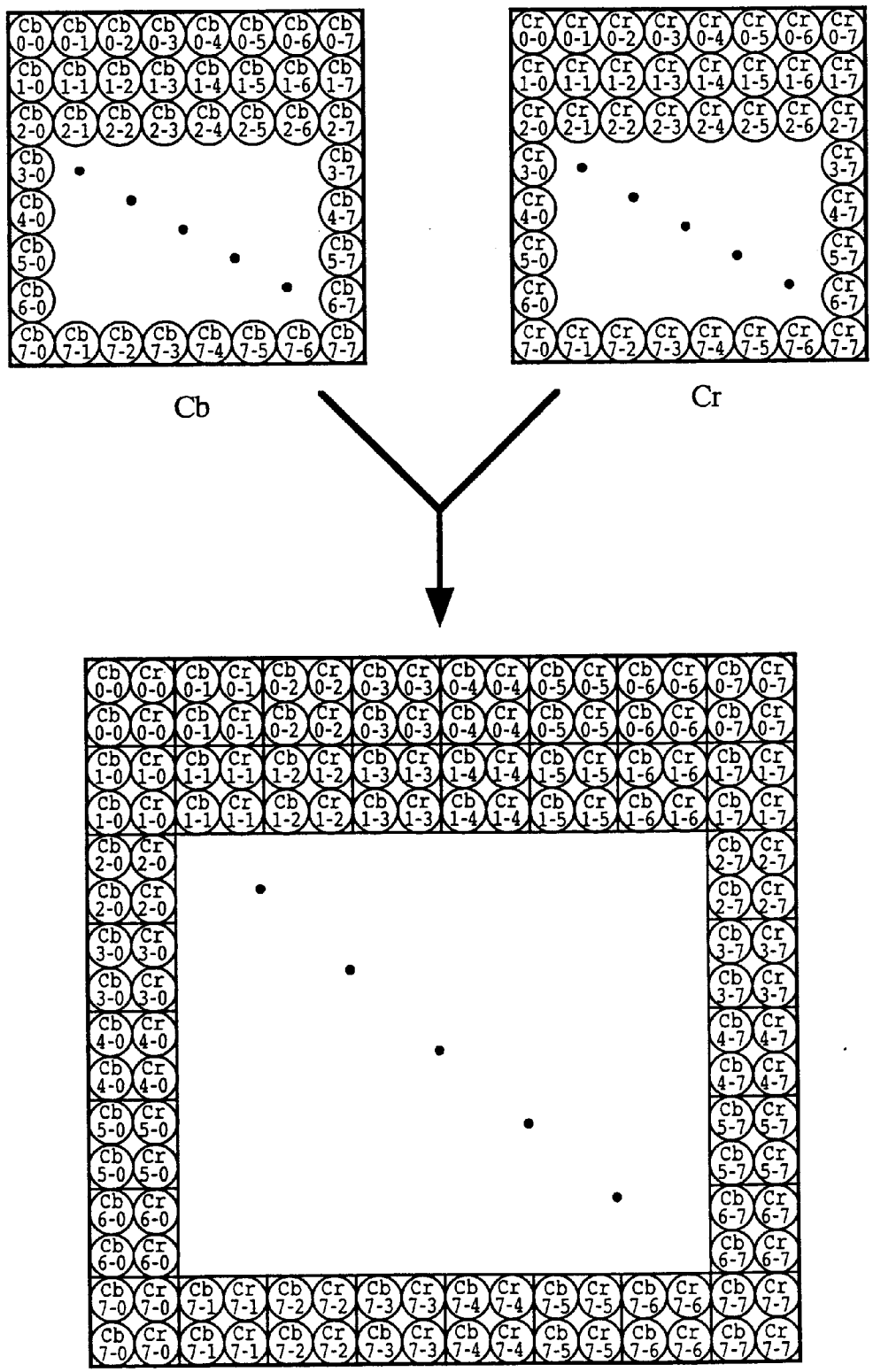
FIG. 11 is a diagram showing a block for a predicted image signal, which is searched by a motion vector detecting device according to the second embodiment of the present invention.
Figure 12:
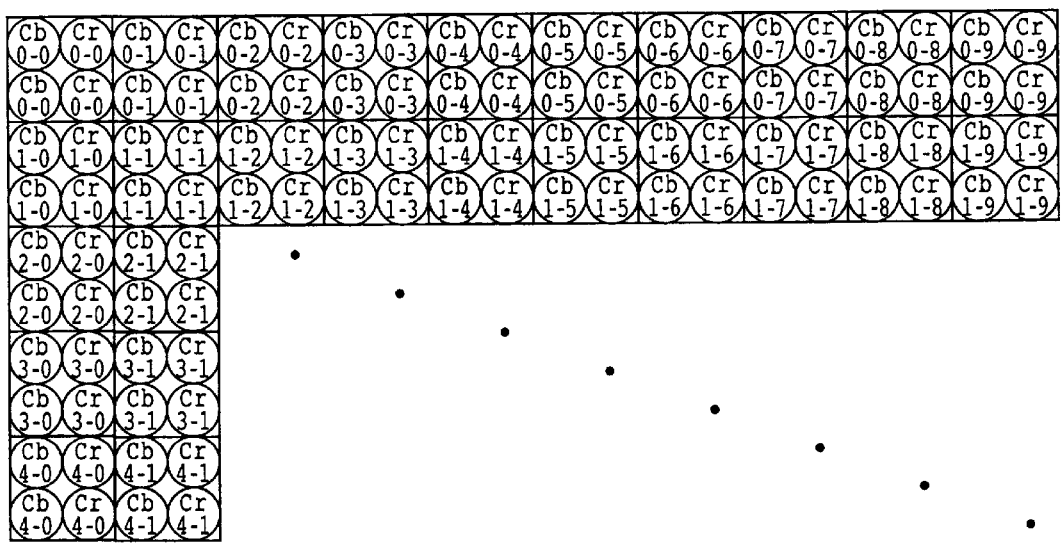
FIG. 12 is a diagram illustrating a block for a reference image signal searched by the motion vector detecting device according to the second embodiment of the present invention.

Upon reading the color-difference signals Cb and Cr from memory, a color-difference signal Cb0-0 at the leading address of the color-difference signals Cb is first read and a color-difference signal Cr0-0 at the leading address of the color-difference signals Cr is read next, as shown in FIG. 13(2). In this way, the color-difference signals Cb and Cr at their corresponding addresses are alternately read in address order. After all the color-difference signals Cb and Cr for pixels in the first stage in a vertical direction have been read in this way, the same operation is again repeated. Thereafter, color-difference signals Cb and Cr for pixels in the second stage in a vertical direction are read twice in the same manner as described above. By continuing this operation, a block for a predicted image signal and a block for a reference image signal corresponding to such those as shown in FIGS. 11 and 12 are obtained. A predicted image signal 2 and a reference image signal 7 corresponding to the block for the predicted image signal and the block for the reference image signal are inputted to an evaluated value calculator 11 of the motion vector detector circuit 1.

According to the second embodiment described above, a motion vector detecting device is provided which is capable of obtaining the optimum luminance vector and the optimum evaluated value by using the same motion vector detector circuit, even when the color-difference signals are given in 4:2:0 format, thus decreasing development costs and increasing versatility.

Third Embodiment

In the second embodiment, since the blocks for the color-difference signals are continuously arranged in two pixel lines in the vertical direction based on the values of the color-difference signals for the same pixels, a method of dividing the block for the predicted image signal and the block for the reference image signal into two blocks on alternate pixels in the vertical direction (as shown in FIGS. 6(1) and 6(2) respectively) and separately searching the respective motion vectors with respect to the divided respective blocks cannot be applied to such an arranged block for the predicted image signal.

Figure 14:
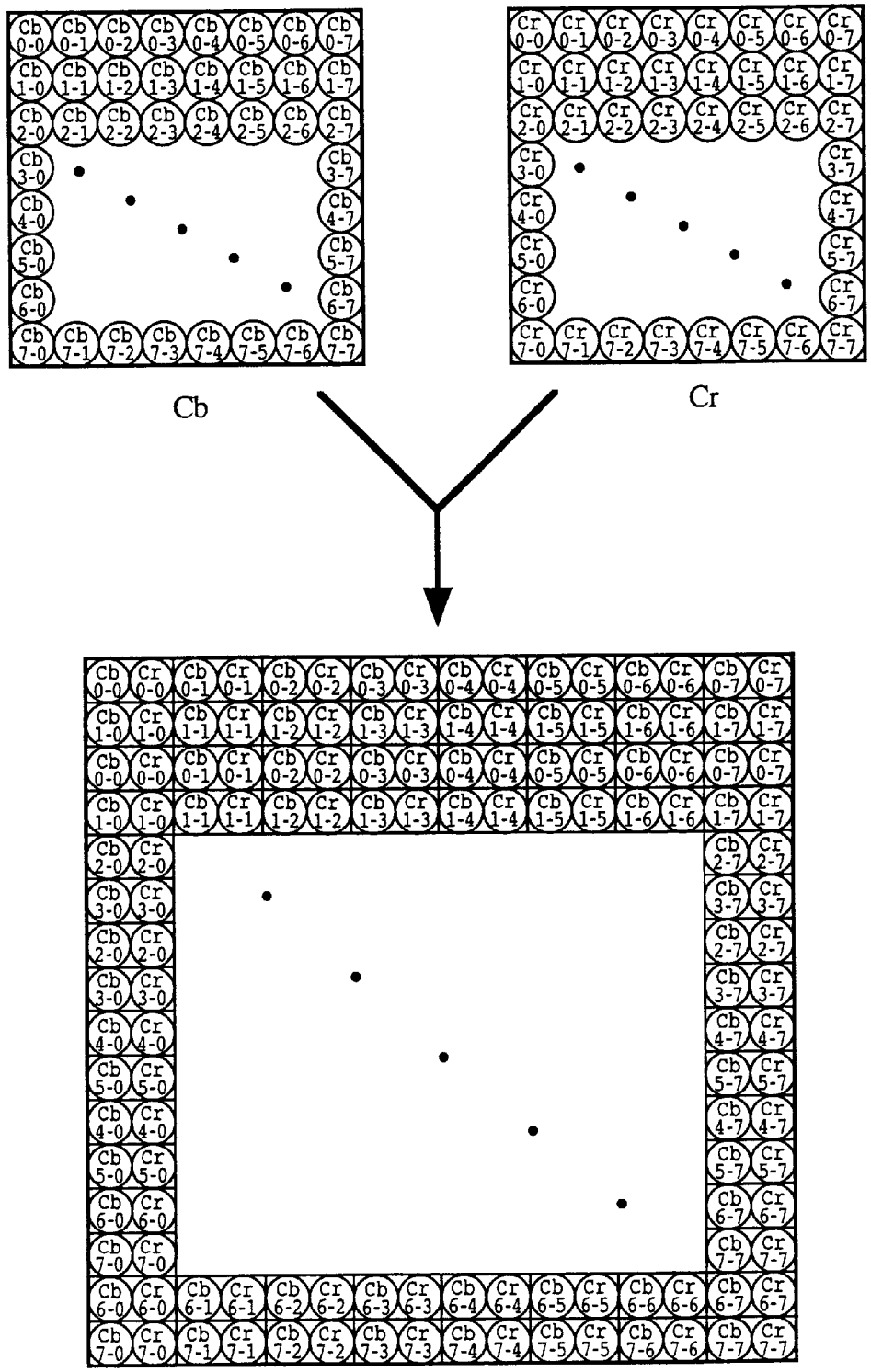
FIG. 14 is a diagram showing a block for a predicted image signal, which is searched by a motion vector detecting device according to the third embodiment of the present invention.

The third embodiment arranges color-difference signals to create a predicted image signal block so that the motion vector searching method shown in FIG. 6(3) can be applied thereto, even when the color-difference signals are in 4:2:0 format. In the third embodiment, predicted image-signal blocks for color-difference signals Cb and Cr are input in a state of being alternately arranged in the horizontal direction and arranged twice in the vertical direction by two pixels, as shown in FIG. 14. In this embodiment, the method of writing the color-difference signals into memory is identical to the method described in the second embodiment in FIG. 13(1). However, the method of reading the color-difference signals from memory is as follows: After the values of color-difference signals Cb at a first stage in the vertical direction are read, the values of color-difference signals Cr at a first stage in the vertical direction are read. This is followed by reading the values of color-difference signals Cb and Cr at second stages in the vertical direction. Lastly, this operation is repeated from beginning to end. Thus, the values are successively read over two stages in the vertical direction so that a block for color-difference signals as shown in FIG. 14 is obtained. Incidentally, the circuit configuration of the third embodiment is identical to the circuit configuration of the first embodiment.

According to the third embodiment described above, a motion vector detecting device is obtained which is capable of obtaining an optimum luminance vector and an optimum evaluated value by using the same motion vector detector circuit, of the motion vector searching method shown in FIG. 6(3), even when the color-difference signals are given in 4:2:0 format, thus reducing development costs and increasing general versatility.

Fourth Embodiment

Each of the first three embodiments described above determined the motion vectors with respect to two types of color-difference signals. However, the fourth embodiment the optimum motion vector (integer accuracy) for singly-used color-difference signals given in one type.

Figures 15(1), 15(2):
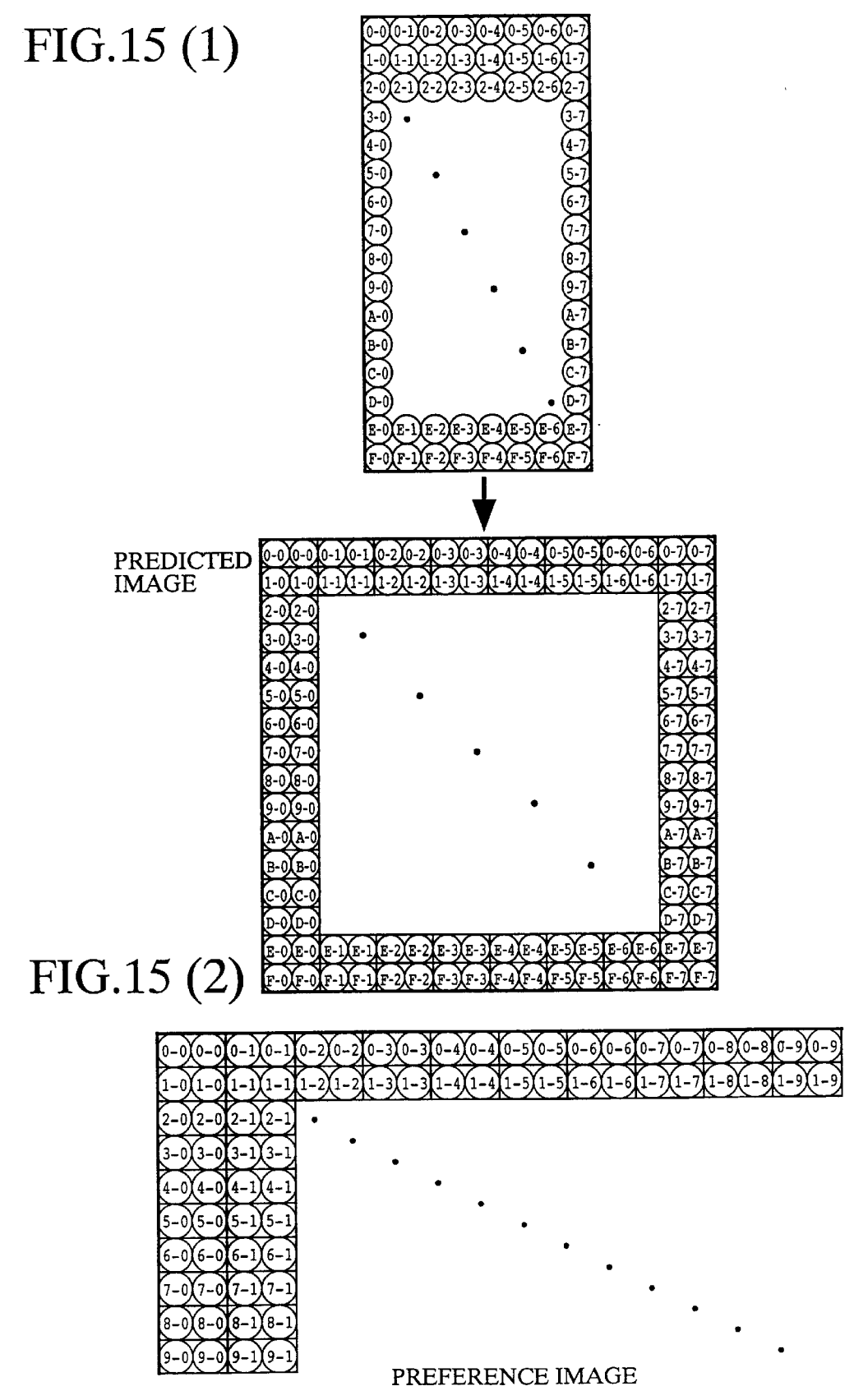

The specific configuration of a motion vector detecting device according to the fourth embodiment is identical to that of according to the first embodiment. Blocks for color-difference signals will be given in 4:2:2 format. Color-difference signals are constructed such that the values of the same pixels are arranged twice in the horizontal direction as shown in FIGS. 15(1) and 15(2) (illustrating of a block for a predicted image signal and a block for a reference image signal respectively). A predicted image signal 2 and a reference image signal 7 are inputted to a motion vector detector circuit 1 of the motion vector detecting device in the order of the pixels in the blocks. To input the color-difference signals in this way, the color-difference signals are stored in memory in address order. Thereafter, the color-difference signals stored in the same addresses of the memory may be read twice in the horizontal direction.

Based on the predicted image signal and the reference image signal inputted into the motion vector detector circuit 1 in this way, an evaluated value calculator 11 determines a motion vector and an evaluated value in a manner similar to the first embodiment. Further, a motion vector selector 13 selects an optimum motion vector 8a and an optimum evaluated value 8b. Thus, the optimum motion vector for single-unit color-difference signals can be searched in the above-described manner.

According to the fourth embodiment described above, about in that a motion vector detecting device is provided which is capable of searching a motion vector for single-unit color-difference signals given in 4:2:2 format using a motion vector detector circuit which is identical to that used for a luminance vector search, thus reducing development costs and increasing large general versatility.

Fifth Embodiment

Figure 16:
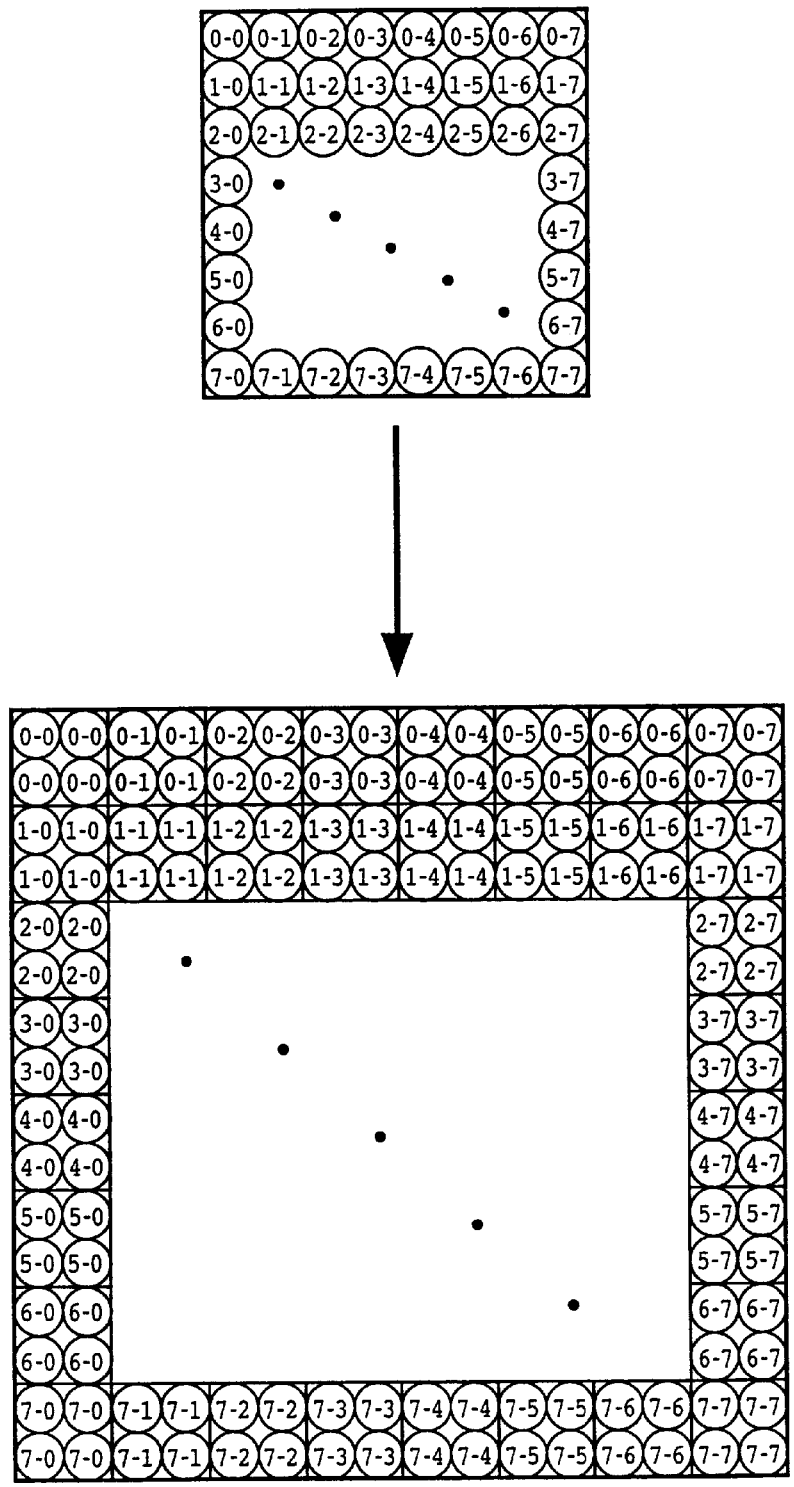
FIG. 16 is a diagram illustrating a block for an image signal to be predicted, which is searched by a motion vector detecting device according to a fifth embodiment of the present invention.
Figure 17:
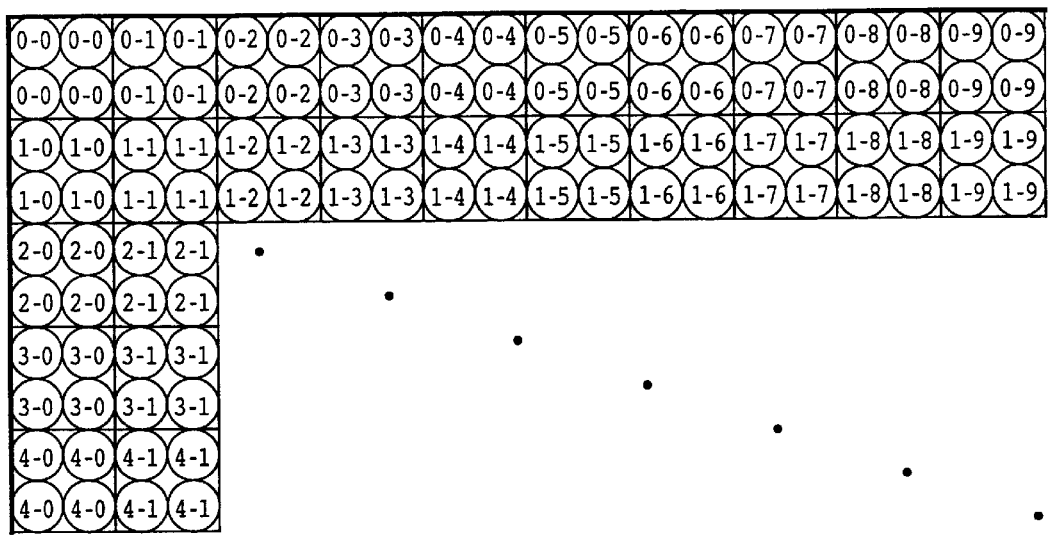
FIG. 17 is a diagram depicting a block for a reference image signal searched by the motion vector detecting device shown in FIG. 16.

The fourth embodiment determines the optimum vector for the color-difference signals given in 4:2:2 format. However, a motion vector detecting device according to a fifth embodiment obtains an optimum vector for color-difference signals in 4:2:0 format. A block for a predicted image signal and a block for a reference image signal are each configured so that the color-difference signals are arranged twice in the horizontal and vertical directions respectively as shown in FIGS. 16 and 17. A predicted image signal 2 and a reference image signal 7 are respectively inputted into a motion vector detector circuit 1 of the motion vector detecting device in the order of the pixels in the blocks. To input the color-difference signals in this way, the color-difference signals are stored in memory in address order and thereafter the color-difference signals stored in the same addresses of the memory may be repeatedly read twice in the horizontal and vertical directions.

An evaluated value calculator 11 determines a motion vector and an evaluated value, based on the predicted image signal 2 and the reference image signal 7 inputted into the motion vector detector circuit 1 in a manner similar to the first embodiment. Further, a motion vector selector 13 selects an optimum motion vector 8a and an optimum evaluated value 8b. Thus, the optimum motion vector for single-unit color-difference signals can be searched.

According to the fifth embodiment described above, a motion vector detecting device is obtained which is capable of searching a motion vector for single-unit color-difference signals in 4:2:0 format using a motion vector detector circuit which is identical to that used for a luminance vector search, thus reducing development costs and increasing large general versatility.

Sixth Embodiment

In the fifth embodiment, as in the second embodiment, since the color-difference signals corresponding to the same pixels are continuously arranged by rows of two in the vertical direction as the blocks for the color-difference signals, this technique cannot be applied to the motion vector searching method shown in FIG. 6(3). In the sixth embodiment, color-difference signals are arranged and a block for a predicted image signal is created so that the motion vector searching method shown in FIG. 6(3) can be applied thereto, even when the color-difference signals are in 4:2:0 format.

Figure 18:
FIG. 18 is a diagram showing a block for an image signal to be predicted, which is searched by a motion vector detecting device according to a sixth embodiment of the present invention.

In the sixth embodiment, color-difference signals for the same pixels are repeated twice in the horizontal direction as shown in FIG. 18 to obtain a block for a predicted image signal which is related to the color-difference signals. Further, the color-difference signals for the same pixels are arranged twice on the basis of two pixels in the vertical direction. A predicted image signal 2 is inputted to a motion vector detector circuit 1 in order of pixels of this block. A method of reading the color-difference signals used to input the predicted image signal from memory is as follows: The values of the same pixels are each read twice in the horizontal direction and then reading is performed by two pixels in the vertical direction. Next reading is performed by two pixels in the vertical direction once again. Thereafter, the same scanning is repeated to read the values of the next two pixels extending in the vertical direction and the read values are inputted to the motion vector detector circuit 1.

The operation of selecting an optimum motion vector 8a and an optimum evaluated value 8b by a motion vector selector based on the predicted image signal 2 and the reference image signal 7 inputted to the motion vector detector circuit 1 is identical to that in the fifth embodiment. Thus, an optimum motion vector for single-unit color-difference signals can be searched.

According to the sixth embodiment described above, a motion vector detecting device is provided which is capable of searching an optimum luminance vector and an optimum evaluated value using the same motion vector detector circuit. This result is acheived even when the motion vector searching method shown in FIG. 6(3) is applied and when the color-difference signals are in 4:2:0 format, thus reducing development costs and providing large general versatility.

Figure 19:
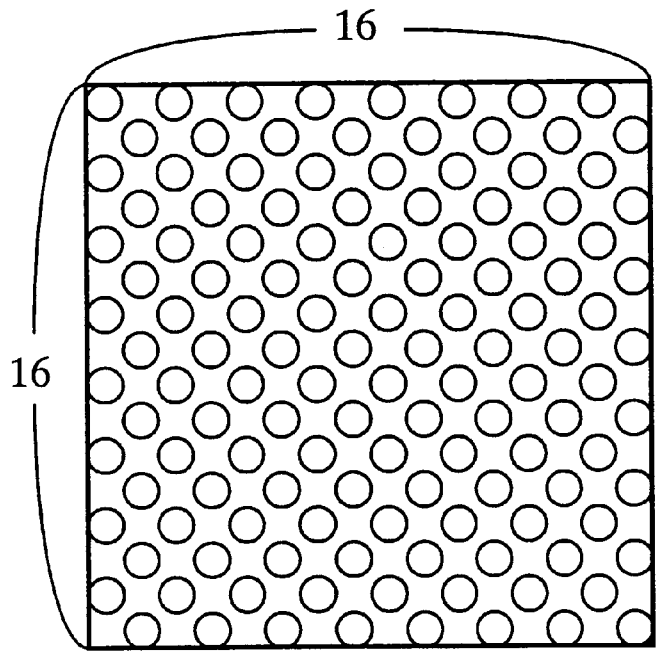
FIG. 19 is a diagram illustrating an example of a block for both a predicted image signal and a reference image signal when sub-sampling.
Figure 20:
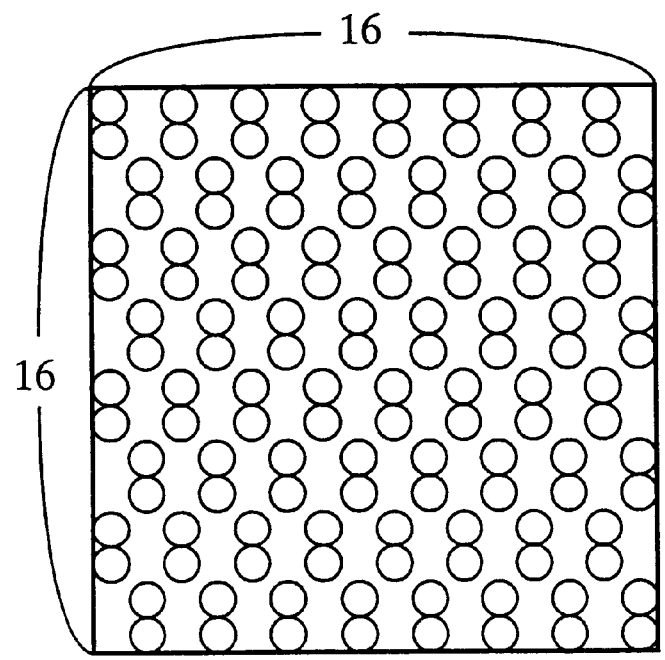
FIG. 20 is a diagram depicting an example of a block for both a predicted image signal and a reference image signal when sub-sampling.
Figure 21:
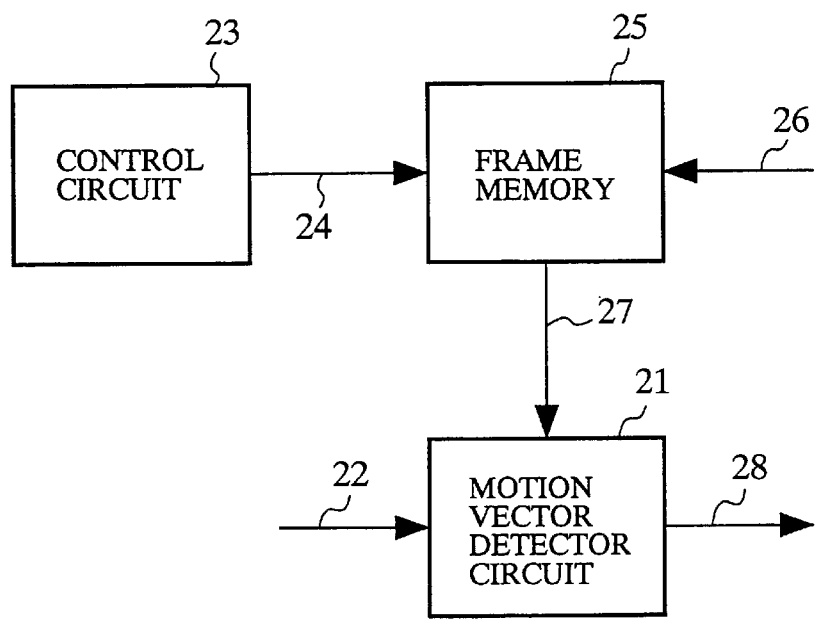
FIG. 21 is a block diagram showing a configuration of one example of a conventional motion vector detecting device.
Figure 22:
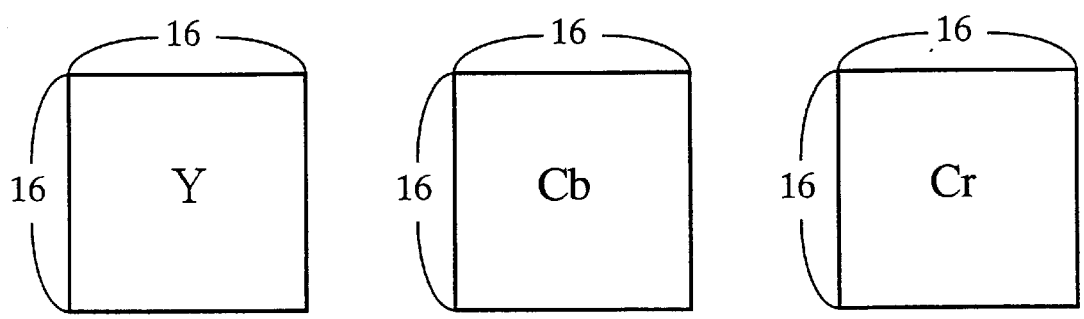
FIG. 22 is a diagram illustrating examples of blocks for a luminance signal and color-difference signals.
Figure 23:
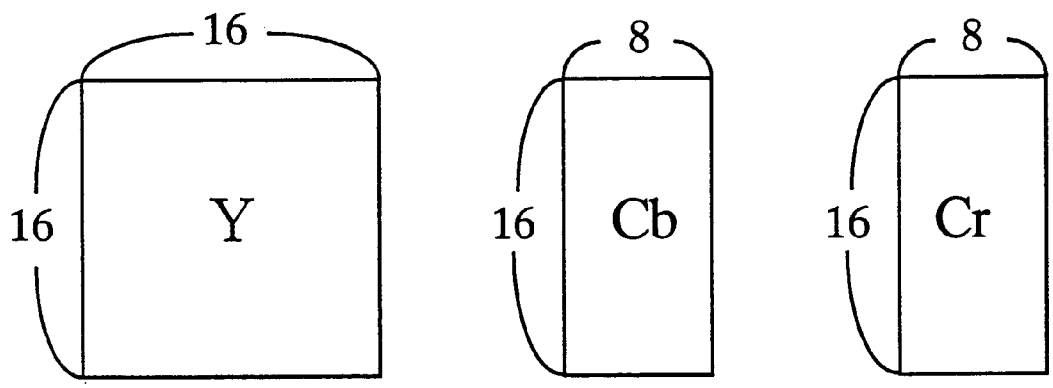
FIG. 23 is a diagram depicting another examples of blocks for a luminance signal and color-difference signals.
Figure 24:
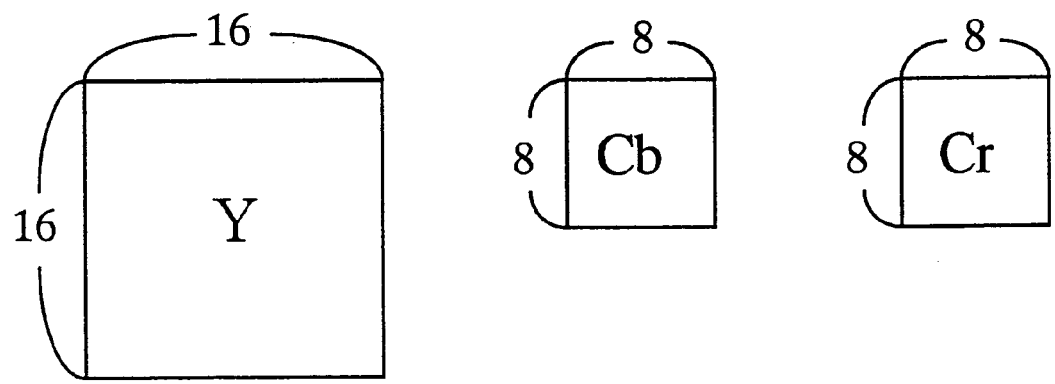
FIG. 24 is a diagram showing further examples of blocks for a luminance signal and color-difference signals.

In each of the abovae-described embodiments, subsampled blocks shown in FIGS. 19 and 20, in which only some images are extracted from 16×16-pixels blocks, may be used to represent the predicted image signals 2.

While preferred embodiments of the present invention have been described above, such description is merely illustrative of the principles of the present invention. It should be understood that modifications and changes from the above-described embodiments these description can be made without departing from the spirit and scope of the following claims.

What is claimed is:

1. A motion vector detecting device for dividing an image luminance signal and image color-difference signals into blocks, each block having a fewer number of pixels than the number of pixels of one image, and determining an optimum motion vector for each of the luminance signal and the color-difference signals according to block matching, comprising:

color-difference signal block generating means for re-arranging pixel values of an initial block for said color-difference signals, allowing for their superimposition, to generate a new color-difference signal block having the same number of pixels as the luminance signal block;

evaluated value calculating means for comparing the new color-difference signal block generated by said color-difference signal block generating means and the luminance signal block with a block for a reference image signal to perform the block matching, thereby detecting motion vectors and evaluated values; and motion vector selecting means for selecting an optimum evaluated value and an optimum motion vector corresponding to the optimum evaluated value from the evaluated values and motion vectors calculated by said evaluated value calculating means.

2. A motion vector detecting device according to claim 1, wherein, when the number of horizontal pixels in the initial block for said color-difference signals is equal to one-half the number of horizontal pixels in the luminance signal block, said color-difference signal block generating means repeatedly arranges the values of the same pixels for the color-difference signals twice in the horizontal direction to create a new color-difference signal block having the same number of pixels as the luminance signal block.

3. A motion vector detecting device according to claim 1, wherein, when the number of horizontal pixels and the number of vertical pixels in the initial block for said color-difference signals are equal to one half of horizontal pixels and the number of vertical pixels in the luminance signal block respectively, said color-difference signal block generating means arranges the values of the same pixels for the color-difference signals twice in each of the horizontal and vertical directions to create a new color-difference signal block having the same number of pixels as the luminance signal block.

4. A motion vector detecting device according to claim 1, wherein, when the number of horizontal pixels and the number of vertical pixels in the initial block for the color-difference signals are equal to one half the number of horizontal pixels and the number of vertical pixels in the luminance signal block respectively, said color-difference signal block generating means arranges the values of the same pixels for the color-difference signals twice in the horizontal direction and then arranges the values of the twice-arranged horizontal pixels by a two pixel-wide block in the vertical direction twice to create a new color-difference signal block having the same number of pixels as the luminance signal block.

5. A motion vector detecting device according to claim 1, wherein said motion vector selecting means eliminates evaluated values when a horizontal vector assumes an odd number upon block matching from objects to be selected by said motion vector selecting means, and selects an optimum evaluated value and an optimum motion vector corresponding to the optimum evaluated value.

6. A motion vector detecting device according to claim 5, wherein, when the number of horizontal pixels in the initial block for the color-difference signals is equal to one-half the number of horizontal pixels in the luminance signal block, said color-difference signal block generating means alternately arranges the values of corresponding pixels for two types of color-difference signals in the horizontal direction to generate a new color-difference signal block having the same number of pixels as that of the luminance signal block.

7. A motion vector detecting device according to claim 5, wherein, when the number of horizontal pixels and the number of vertical pixels in the initial block for the color-difference signals are each equal to one-half the number of horizontal pixels and the number of vertical pixels in the luminance signal block respectively, said color-difference signal block generating means alternately arranges the values of corresponding pixels for two types of color-difference signals in the horizontal direction and arranges the values of the alternately-arranged horizontal pixels twice in the vertical direction to create a new color-difference signal block having the same number of pixels as the luminance signal block.

8. A motion vector detecting device according to claim 5, wherein, when the number of horizontal pixels and the number of vertical pixels in the initial block for the color-difference signals are equal to one-half of the number of horizontal pixels and the number of vertical pixels in the luminance signal block respectively, said color-difference signal block generating means alternately arranges the values of corresponding pixels for two types of color-difference signals in the horizontal direction and arranges the values of the alternately-arranged horizontal pixels by a two pixel-wide block in the vertical direction twice to create a new color-difference signal block having the same number of pixels as the luminance signal block.

9. A motion vector detecting method of dividing image luminance and an image color-difference signals into blocks, each block number having of pixels which is smaller than the number of pixels of one image, and determining optimum motion vectors for each of the luminance and the color-difference signals according to block matching, comprising:

a color-difference signal block generating step for re-arranging pixels values of the an initial block for said color-difference signals, allowing for their superimposition, to generate a new color-difference signal block having the same number of pixels as the luminance signal block;

an evaluated value calculating step for comparing the new color-difference signal block generated in said color-difference signal block generating step and the luminance signal block with a block for a reference image signal to perform block matching, thereby detecting motion vectors and evaluated values; and a motion vector selecting step for selecting an optimum evaluated value and an optimum motion vector corresponding to the optimum evaluated value from the evaluated values and motion vectors calculated by said evaluated value calculating step.

10. A motion vector detecting method according to claim 9, wherein, in said motion vector selecting step, evaluated values for when a horizontal vector assumes an odd number upon block matching are eliminated from objects to be selected so that an optimum evaluated value and an optimum motion vector corresponding to the optimum evaluated value are selected.

\* \* \* \* \*